United States Patent [19]
Hawkins et al.

[11] Patent Number: 6,005,561
[45] Date of Patent: *Dec. 21, 1999

[54] INTERACTIVE INFORMATION DELIVERY SYSTEM

[75] Inventors: William Hawkins, Atherton; Roderick Perkins, Menlo Park; William Duvall, Portola Valley, all of Calif.

[73] Assignee: The 3DO Company, Redwood City, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/355,755

[22] Filed: Dec. 14, 1994

[51] Int. Cl.$^6$ .............................. H04N 7/10; H04H 1/02
[52] U.S. Cl. .............................. 345/327; 348/6; 348/10; 348/906; 455/6.1; 455/6.2
[58] Field of Search .................... 348/6, 7, 8, 10, 348/12, 13, 906; 455/4.1, 4.2, 5.1, 6.1, 6.2, 6.3; 395/200.09, 155–161, 200.47, 200.48, 200.49; 709/217–219; 345/326, 327; H04N 7/10, 7/14

[56] References Cited

U.S. PATENT DOCUMENTS

| | | | |
|---|---|---|---|
| 5,014,125 | 5/1991 | Pocock et al. | 358/86 |
| 5,440,632 | 8/1995 | Bacon et al. | 348/12 |
| 5,473,609 | 12/1995 | Chaney | 348/906 X |
| 5,479,268 | 12/1995 | Young et al. | 348/13 |
| 5,515,106 | 5/1996 | Chaney et al. | 348/906 X |
| 5,539,920 | 7/1996 | Menand et al. | 455/5.1 |

*Primary Examiner*—John W. Miller
*Attorney, Agent, or Firm*—Fliesler, Dubb, Meyer & Lovejoy LLP

[57] ABSTRACT

An information delivery system including a head end broadcasting a data stream of media objects, the head end being coupled to a broadcast television interface and at least one information service provider and including an encoder for encoding information in the media object is disclosed. The system may deliver and implement a programming guide delineating programming information available on the information delivery system in one or more media objects in the data stream in an encoded fashion by the encoder. A user terminal is coupled to the head-end and receives the media objects. The user terminal has an output and includes a decoder for the media objects. Also provided in one aspect is a user interface, at least partially stored in the user-terminal, which selects a user-defined subset of media objects for provision to the output of the user terminal. Further, an information navigation system for an information delivery system is provided. The navigation system functions with the electronic program guide and includes a user interface having a plurality of icon representations of various functions of the system, and including a broadcast television interface. The navigation system also includes a smart service navigator which interacts with the user interface and the electronic program guide to provide an output to the user.

22 Claims, 9 Drawing Sheets

| Object Code | Object Types | Size | Bit Requirement |
|---|---|---|---|
| Text | ≈ 3000 lines of 'C' code complies into... | 50.0 KB | =0.40 Mb |
| Music | 15 lines of 40 chars | 0.6 KB | =0.005 Mb |
| Photo | Midi Sequence for 4 minutes @ 8 voices | 10.0 KB | =0.08 Mb |
| Animation | 320 x 240 x 16 bits uncompressed | 153.6 KB | =1.23 Mb |
| Fonts | 1/10th screen @ 15 fps @ 3 secs uncompressed | 691.2 KB | =5.53 Mb |
| Video | full character set @ 18 & 24 pt | 13.4 KB | =0.11 Mb |
| | quarter resolution MPEG | 85.0 KB | =0.68 Mb |

*FIG. 5*

| Interfaces | Code | Text | Music | Photo | Animation | Fonts | Video |
|---|---|---|---|---|---|---|---|
| Help & Tours | 1 | 1 | 1 | 1 | 1 | 1 | 1 |
| Video on Demand | 1 | 1000 | 1 | 1 | 0 | 1 | 4 |
| PPV Events | 1 | 30 | 1 | 1 | 0 | 1 | 4 |
| EPG | 1 | 1000 | 1 | 1 | 1 | 1 | 0 |
| Preferences | 1 | 1 | 1 | 1 | 1 | 1 | 0 |
| Check Reservation | 1 | 1 | 1 | 1 | 1 |  | 0 |
| Advertisements | 1 | 1 | 1 | 1 | 1 | 1 | 0 |
|  | Interfaces beyond the scope of Base Services | | | | | | 0 |
| Bulletin Board | 1 | 50 | 1 | 1 | 1 | 1 | 0 |
| Guest Services | 1 | 1 | 1 | 1 | 1 | 1 | 0 |
| Games | 1 | 1 | 1 | 1 | 1 | 1 | 0 |
| Education | 1 | 1 | 1 | 1 | 1 | 1 | 0 |
| Reference | 1 | 1 | 1 | 1 | 1 | 1 | 0 |
| Total Bits | 4.8mb | 10.0mb | 1.0mb | 14.7mb | 55.3mb | 1.3mb | 6.1mb |

*FIG. 6*

Overall Bandwidth Requirements and Worst Case Latency

| Interfaces | Data Bandwidth | Delivery Time | RAM Space w/o Video |
|---|---|---|---|
| Help & Tours | 8.0 mb | =0.33 secs | 918.8 KB |
| Video on Demand | 9.3 mb | =0.38 secs | 827.0 KB |
| PPV Events | 4.7 mb | =0.19 secs | 245.0 KB |
| EPG | 12.1 mb | =0.50 secs | 1518.2 KB |
| Preferences | 7.4 mb | =0.30 secs | 918.8 KB |
| Check Reservation | 7.4 mb | =0.30 secs | 918.8 KB |
| Advertisements | 7.4 mb | =0.30 secs | 918.8 KB |
| Bulletin Board | 7.6 mb | =0.31 secs | 948.2 KB |
| Guest Services | 7.4 mb | =0.30 secs | 918.8 KB |
| Games | 7.4 mb | =0.30 secs | 918.8 KB |
| Education | 7.4 mb | =0.30 secs | 918.8 KB |
| Reference | 7.4 mb | =0.30 secs | 918.8 KB |
| Total Stream Bandwidth or worst case latency | 93.2 mb | =3.84 secs | |

FIG. 8

INTERACTIVE INFORMATION DELIVERY SYSTEM

CROSS-REFERENCE TO RELATED APPLICATIONS

METHOD FOR CONTROLLING A SPRYTE RENDERING PROCESSOR; U.S. Pat. No. 5,596,693, issued Jan. 21, 1997, based on application Ser. No. 08/509,674, filed Jul. 31, 1995, which is a File Wrapper Continuation application of application Ser. No. 7/970,278 filed Nov. 2, 1992; Inventors: David L. Needle, Robert J. Mical RESOLUTION ENHANCEMENT FOR VIDEO DISPLAY USING MULTI-LINE INTERPOLATION; U.S. Pat. No. 5,481,275, issued Jan. 2, 1996, based on application Ser. No. 7/970,287 filed Nov. 2, 1992; Inventors: Robert J. Mical, David L. Needle, Teju J. Khubchandani, Stephen H. Landrum DIGITAL SIGNAL PROCESSOR ARCHITECTURE; application Ser. No. 08/501,163, filed Jul. 11, 1995, which is a File Wrapper Continuation application of application Ser. No. 8/001,463 filed Jan. 6, 1993, now abandoned; Inventors: Donald M. Gray, III, David L. Needle AUDIO/VIDEO COMPUTER ARCHITECTURE; application Ser. No. 08/591,952, filed Jul. 23, 1996, now abandoned, which is a File Wrapper Continuation application of application Ser. No. 08/442,634, filed May 17, 1995, now abandoned, which is a File Wrapper Continuation application of application Ser. No. 7/970,308 filed Nov. 2, 1992; Inventors: Robert J. Mical, David L. Needle IMPROVED METHOD AND APPARATUS FOR PROCESSING IMAGE DATA; U.S. Pat. No. 5,572,235, issued Nov. 5, 1996, based on application Ser. No. 7/970,083 filed Nov. 2, 1992; Inventors: Robert J. Mical, David L. Needle SPRYTE RENDERING SYSTEM WITH IMPROVED CORNER CALCULATING ENGINE AND IMPROVED POLYGON-PAINT ENGINE; application Ser. No. 7/970,289 filed Nov. 2, 1992, now abandoned; Inventors: David L. Needle, Robert J. Mical, Stephen H. Landrum, Donald M. Gray, III METHOD AND APPARATUS FOR UPDATING A CLUT DURING HORIZONTAL BLANKING; application Ser. No. 08/300,867, filed Sep. 2, 1994, which is a File Wrapper Continuation of application Ser. No. 7/969,994 filed Nov. 2, 1992, now abandoned; Inventors: Robert J. Mical, David L. Needle, Teju J. Khubchandani DISPLAY LIST MANAGEMENT MECHANISM FOR REAL-TIME CONTROL OF BY-THE-LINE MODIFIABLE VIDEO DISPLAY SYSTEM; U.S. Pat. No. 5,502,462, issued Mar. 26, 1996, based on application Ser. No. 8/146,505 filed Nov. 1, 1993; Inventors: Robert J. Mical, David L. Needle, Stephen H. Landrum, Teju J. Khubchandani EXPANSION BUS; application Ser. No. 08/302,380, filed Sep. 8, 1994, now abandoned, which is a File Wrapper Continuation application of application Ser. No. 8/001,070 filed Jan. 6, 1993, now abandoned; Inventors: Richard B. Tompane, Dean M. Drako, David L. Needle Each of these patent applications is assigned to the assignee of the present invention and is specifically incorporated by reference into the present application.

BACKGROUND OF THE INVENTION

1. Field of the Invention

The invention relates to the delivery, selection and communication of information in an interactive format, and specifically to the delivery and selection of information delivered to a television user over a cable television system.

2. Description of the Related Art

Television has traditionally been a broadcast medium of entertainment. Service providers, such as television stations and networks, broadcast entertainment and information programming via a communications medium, such as a television network or cable system from the head-end of the communications system to a client or individual user at the receiving end of the system. While in the early days of television, this meant transmission of the broadcast signals through the air, more recently, cable networks have become commonplace. Transmission of the broadcast signals through the cable network provides a much wider signal transmission bandwidth and opens the possibility for the transmission of data in large quantities to the user. Bandwidth is defined as the information capacity of a particular transmission system. This traditional model of one-way communication between the service provider and the user has recently begun to change with the proliferation of interactive communication between the client and the service provider.

The television and cable network communication medium is a particularly advantageous way to transmit a great volume of information from the service providers to the end users, the viewers, and to provide an interactive mechanism for the viewer to utilize services such as video on demand, home shopping, interactive games, and home banking using the television as the interface. However, using television as the mechanism for correspondence between the service provider and the end user requires extensive modification of existing communication hardware to provide one or more of the following: greater signal bandwidth, more powerful head-end servers, and more powerful end-user receivers.

As shown in FIG. 1, a typical cable television system comprises four main elements: the head-end 10, a central originating point of all signals carried, where signals are received from service providers (television networks, special channels, etc.) in process; a trunk system 12, the main artery carrying signals through a community; a distribution system (including trunk bridging amplifiers 14), which is bridged from the trunk system and carries signals to individual neighborhoods for distribution to subscribers; and subscriber drops 16, including individual lines 18 to subscribers' television sets fed from taps (Area 1, Area 2 . . . Area X) in the distribution system. The head-end may include a satellite antenna system, tape processing, live programming cameras, signal-processing equipment, pilot carrier generators, combining networks, and equipment for bi-directional interactive services. The subscriber equipment may comprise end-user terminals, converters, de-scramblers, teletext decoding equipment, and the like, depending on the particular service in place and the sophistication in bandwidth of the given system. The trunk system may be physically composed of open air broadcasts, fiber optic lines, coaxial lines, or a combination of each.

In addition to providing video and music programming, in an interactive system, a significant quantity of information must be transmitted to the viewer as part of the interactive service environment. For example, the interactive environment may include several different interface screens utilizing a "multi-media" format (combining several different types of data, video, and audio), and a pointer or other means (such as a control pad-controlled cursor) for interacting with each of the data, audio, and video elements on the interface screen. As yet, no standard transmission or interaction format for the distribution system has been settled upon, and a number of standards are currently under development by television, telephone, or other communications providers.

A number of commercial services currently exist which provide broadcast programming along with data to a home viewer. Perhaps the most basic of these is commonly referred to as "Teletext," and provides cyclical digital data inserted in the vertical blanking interval of a video signal. (The vertical blanking interval is a standard interspersed period in a video signal which is approximately the black level of the signal, used to accommodate retrace periods of display scanning.) The amount of data which may be supported and transmitted by the Teletext system is limited by the bandwidth of the vertical blanking interval. As such, the data capacity is limited and the net result is usually the provision of this format of a few lines of text at the base of a television screen in the user's home. Teletext services can provide a viewer with a wide variety of useful information which can be program oriented, or completely independent of the program. The viewer uses a remote control key pad to select television images, teletext pages, or a combination of both. Some forms of two-way teletext exist, but these systems usually include an entry keyboard and a return link, via a telephone line, to a database.

A second commercial service to provide data over television transmissions is known as the "Sega Channel." The objective of the Sega Channel is to allow users of the Sega video game system to download software games directly from a broadcast channel for use on the game system rather than requiring the individual user to go to a retail store to purchase game cartridges. The Sega Channel broadcasts game program data on a standard cable channel via a cable network, in a continuous data stream of software games which the user may desire to download. Each game is broadcast at a different time, and broadcast information includes game identification information which is decoded by the game system in the user's home and which identifies the game to the system for downloading. The game system shows the individual user a selection menu on the user's television from which the user can select the particular game he or she wishes to download. When the game is transmitted over the broadcast medium at the appointed broadcast time, the game will be downloaded into the game system and the user may then play the game in the game unit. The Sega channel transmission scheme does not include any provision for "backchannel" information from the user to the information service provider.

Another commercial broadcast system which does provide some backchannel communication, but is limited to smaller broadcast environments, is commercially known as "Spectravision." Spectravision is generally set up in small environments such as hotels, resorts, or other limited areas, and the viewer is provided with one or more screens of information for video on demand, and hotel services such as in-room checkout, room service, and billing queries. The user, through an end-user box and accompanying remote control interface, can request in-room movies through the video on demand interface, request account information, or perform a check out, all through the Spectravision interface. Information which must be transmitted to the user in this system includes the complete video on demand menu (several screens of data), customer services menus and summaries of account information on the customer's charges during the stay in the hotel, and menus which the consumer may scroll through on demand and select to perform such services. This usually represents a fair amount of textual information, however, the backchannel communication for such a system is minimal, thereby limiting user response and choice. A local server for the particular small area which Spectravision services is all that is required. Spectravision also provides the viewer with the ability to switch between dedicated Spectravision services and regular full broadcast television services.

In providing interactive services in larger cable network applications, the main problem which arises is that of server and communications overhead. Allowing each subscriber to browse and navigate through all available services, (such as an electronic program guide for video-on-demand services,) creates substantial processing overhead on the head-end server. This, in turn, requires that the speed and capacity of the head-end server be increased for the system as a whole to be commercially effective, which increases the cost of the system.

As shown in FIG. 2, an interactive delivery system requires a physical delivery system which provides back-channel communication. An attempt to provide a fully interactive television interface on a larger scale will be made by U.S. West, Inc., a telecommunications company, which will conduct a trial of an interactive system in Omaha, Nebr. In the U.S. West example, the network configuration will comprise a broad-band network to provide video and data services. The broadband network is comprised of a head-end broadcasting server 20 providing transmission to a plurality of video switches 24 and nodes 26. The video switch will transmit packets of data continuously or in bursts through the broad-band network. The video switch 24 will deliver signals to a node 26 that will serve from 200 to 2,000 homes. From the video node, dual co-axial cables A,B will be used for distributing video signals to a pedestal that will contain video distribution equipment, video interaction equipment, and an optical network unit. As shown in FIG. 3B, the video portion of the network is a dual co-axial cable design, with a sub-split design "A" cable providing 650 mhz of bandwidth to support 77 analog channels, up to 136 digital channels, and 25 mhz of shared upstream (or backchannel) capacity. The spectrum "B" cable provides 500 mhz of bandwidth to support up to 664 digital channels and 107 mhz of shared backchannel capacity. The split design allows for channel frequency compatibility of the analog channels with existing cable-ready TV sets, while the "B" channel provides backchannel capacity anticipated for the more interactive services expected to use digital channels. A spectrum of the transmission bandwidth of approximately 1 GHz is shown in FIG. 3A. This U.S. West embodiment illustrates how the aforementioned problems will result. The communications overhead on the head-end which will result from backchannel communications and viewer demand, even in the limited service area of the experiment, is quite significant.

When a user is browsing or merely viewing the possible selections available from the head-end, communication with the head-end server is required; however, no revenue for the service provider is created during the browsing events. Thus, activities such as browsing increase the cost for all revenue-generating activity. It would therefore be desirable to reduce the load on the head-end server which is required for any such non-revenue generating activity.

In the aforementioned prior art transmission schemes, the bandwidth allocated from the head-end to the home user is quite large in comparison to the backchannel band-width allocated for viewer communication to the server. Because the total amount of bandwidth through the backchannel which will be required at the head-end at any given time will fluctuate with the use pattern of the subscribers (the number of subscribers making demands on the head end at a given time and the activities of those subscribers), such fluctuation will place unpredictable communication latencies on the system. It is important to determine all communication latencies on the backchannel to determine operating parameters for a commercially viable system and for service providers to configure their programming so that the user is not unduly burdened during the periods of maximum latency in the system.

Additional processing overhead is required during handshaking. Handshaking comprises the interaction with all communications to the server involving a response mechanism to the user which ensures reliable communications between the server and the user. A simplified communications model that does not require, or at least minimize, server intervention in handshaking is desirable.

Congestion within the communications pipeline resulting from large bursts of backchannel communication can impair the quality of service to viewers by resulting in a large latency period. A large volume of backchannel communication or a "connection storm" can occur when large numbers of viewers simultaneously request service, as at the start or end of a popular event, or after a power outage when the users are attempting to re-establish service. This again can result in unpredictable latency times.

Each server has a finite bandwidth, and congestion will occur at the server as the number of requests it must handle increases. Indeed, in large scale implementations, a network of servers will be required to distribute requests and balance the load on the network infrastructure, also increasing the expense of providing service to users.

Any one or more of the aforementioned difficulties could result in the interactive viewing experience being less seamless than the viewer currently experiences with analog television signals. For any system which utilizes digital communication technology to transmit data to a viewer to be commercially viable, the system must make the viewing experience appear as seamless as the viewer's current viewing experience. Viewers have come to expect a minimum level of broadcast quality in television viewing, thereby requiring any new system be comparable to current systems in the manner in which programming and information is presented to the viewer.

Thus, it is desirable to provide an interactive system which will overcome the aforesaid deficiencies in a broadcast communications medium.

One means of disseminating a large amount of data over a network and is the "Data Cycle" proposal and research set forth by Bellcore (Bell Communications Research, Inc.). The data cycle is a proposal for a distributed, shared memory database implemented through use of a storage pump which continuously broadcasts the entire contents of the database over a ring network to a series of access managers which control, for example, SQL-type application access to the data which is broadcast on the network. In the embodiments described in a paper entitled "The Datacycle Architecture: A Database Broadcast System", authors Bowen, et al., a data rate of 52 megabytes per second is supported such that a 32 megabyte database stored on a single storage pump is entirely broadcast every 0.6 seconds. A user seeking to extract data from the database initiates a query through an access manager via one of any suitable number of applications. The access manager then extracts the data and provides it to the application and ultimately the user. The database is continually broadcast over the broadcast channel at a repeating rate, and therefore may be updated via an update manager coupled to the access managers and the storage pump.

As described in the Bowen, et al. paper, the system is useful, for example, in providing a directory assistance database which may be continually updated and provided to the directory assistance operators of a given telephone network.

In consideration of the aforesaid problems, a communications system which reduces the overall overhead at the head-end and still provides complete interactivity and a large quantity of information to the user is therefore desirable.

SUMMARY OF THE INVENTION

It is therefore an object of the invention to provide an information delivery system for use with a communications medium which reduces the overall overhead of the system and yet provide full interactivity for the end user.

A further object of the invention is to provide an information delivery system which operates independently of the physical network to which it is applied and thus may be used on a variety of different networks.

Yet another object of the invention is to provide an information delivery system which can be utilized on current communications networks in use throughout the country.

A further object of the invention is to provide the aforesaid objects using conventional signal and compression schemes currently in place.

A further object of the invention is to provide a standard user interface which is intuitive to use and based on current viewing habits, which provides a viewer access to the services available on the information system, and which may be updated as new and different service providers broadcast on the system.

These and other objects of the invention are provided in an information delivery system having a number of inventive aspects. A first aspect of the invention comprises an information delivery system. The system includes a head end broadcasting a data stream of media objects, the head end being coupled to a broadcast television interface and at least one information service provider, and including an encoder for encoding information in the media object. A programming guide delineating programming information available on the information delivery system may be provided in one or more media objects in the data stream in an encoded fashion by the encoder. A user terminal is coupled to the head-end and receives the media objects. The user terminal has an output and includes a decoder for decoding information in the media objects. Also provided is a user interface, at least partially stored in the user-terminal, which selects a user-defined subset of media objects for provision to the output of the user terminal.

The system allows the reduction of head-end server overhead and predictable system latencies, and one can customize the data stream for individual purposes, or provide additional data streams in hybrid systems using both digital and analog signals.

A second aspect of the invention comprises an encoding structure for an information delivery system. The structure makes use of a dictionary library containing terms and common phrases of the information to be encoded. A listing array is provided which includes a set of listing offsets to the terms and phrases in the dictionary library, and a plurality of listing vectors provide offsets into the listing array. A sorting vector contains sorted offsets into the listing vector and can be used to perform queries of the encoded material while the material is encoded.

The encoding structure provides an improvement over conventional coding structures by optimizing the encoded data structure for decoding by the end user terminal in the information delivery system, and gives greater compression ratios than found in currently-employed techniques.

In yet a third aspect of the invention, an information navigation system for an information delivery system is provided. The navigation system includes an electronic program guide, the electronic program guide comprising a listing of programming available on the information delivery system. The navigation system also includes a user interface having a plurality of object representations (such as icons) of various functions of the system, and including a broadcast television interface. The navigation system also includes a smart service navigator which interacts with the user interface and the electronic program guide to provide an output to the user.

The information navigation system works in conjunction with the delivery system and the encoding structure to deliver to the user a seamless, realistic, real-time interactive viewing experience, while minimizing such problems as communications overhead, transmission congestion, unpredictable system latencies, and finite server bandwidths. In addition, the navigation system provides information to the transmission and service providers which allows the providers to optimize use of the network and services.

BRIEF DESCRIPTION OF THE DRAWINGS

The invention will be described with respect to the particular embodiments thereof. Other objects, features, and advantages of the invention will become apparent with reference to the specification and drawings in which:

FIG. 5 is a table representing media object type, size and bit requirements.

FIG. 6 is a table representing the type and number of media objects suitable for use in a user interface in accordance with the present invention.

FIG. 8 is a table representing the bandwidth and space requirements of the objects shown in FIG. 6.

DETAILED DESCRIPTION OF THE INVENTION

Figure 1:
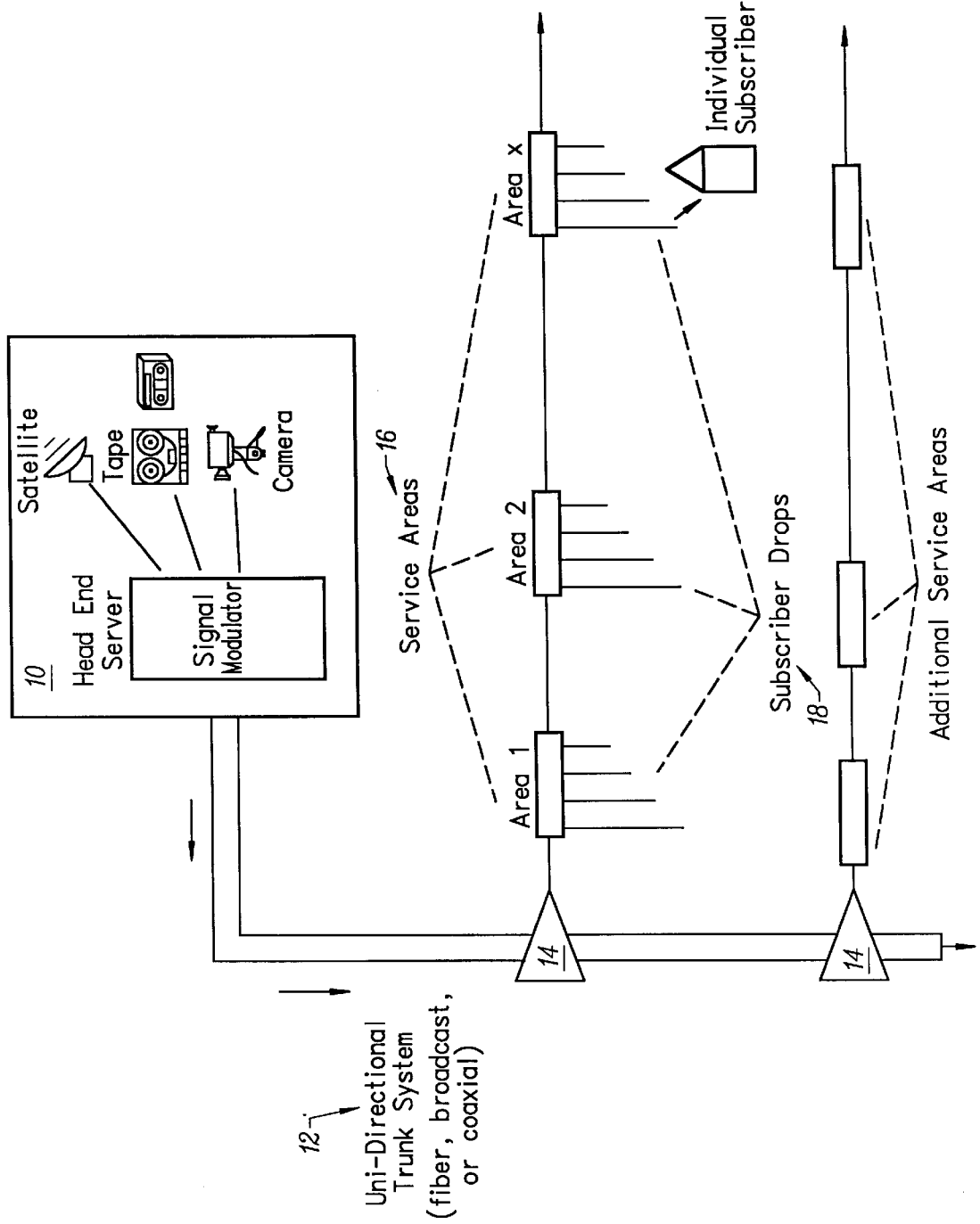
FIG. 1 is a block diagram of a conventional cable television network.

The interactive information delivery system of the present invention will be described with reference to FIGS. 2–9. Although the system of the present invention will be described with reference to a particular hardware embodiment, and specifically the network embodiment publicly disclosed for the U.S. West trial for Omaha, Nebr., it should be understood that the invention is not limited to any particular hardware configuration. Indeed, a feature of the invention is that the system is designed to be utilized on any number of different communication hardware schemes which may be currently in existence or hereafter developed.

Generally, the invention utilizes a broadcast streaming approach to information delivery through a conventional television distribution network. Through this approach, full motion video, still images, artwork, music, information and other data can be provided to the end-user and used as an information guide to all information sources available on the network to minimize the problems which attend implementing an interactive television system. A single broadcast data stream of such information is repeated at a pre-determined rate, with a "smart" end-user terminal decoding the data stream, thus providing a pre-determined and consistent latency period. The data stream may be broadcast on a single 6 mhz broadcast channel, available on any number of commercial cable television networks (including the U.S. West embodiment set forth above). It should be noted that the particular transmission provider is not critical to the invention.

A unique advantage of this system is that information provided through this format can comprise information which would be considered non-revenue generating, but overhead intensive on the head end. Thus, the overhead on the head-end is reduced without any loss of information to the user. In addition, one or more data streams may be utilized, with each stream serving a particular service provider's special requirements. Thus, the service provider may customize both the individual objects which the provider contributes to a common stream transmitted by, for example, a cable network operator, or may generate an exclusive stream of its own to provide exclusive information to its own broadcast stream.

The information is provided to the end-user terminal in the form of media objects. A second feature of the invention is the digital compression and de-compression of the data. Through the use of MPEG-2 data transport, the data, text, video, and other signals in the broadcast data stream can be sent through the normal broadcast channel and contain enough information to supply the "smart" terminal with program and service information to make the output at the user-end appear to be completely interactive, allowing the user to interact with the data without placing undue burdens on the head-end of the system. The stress and sophistication of interactivity on the end-user of the system can be dependent on the hardware in use at the user-end of the system. As hereinafter described, by using video modulation, a 6 mhz channel will support a bandwidth of 30 Mbps when modulated at 64 quadrature-amplitude modulation (QAM). This yields an effective bandwidth of 27 Mbps for the delivery of media objects, after accounting for transport level error correction coding.

An additional feature of the invention is a user interface and service navigator which generally comprises two components. A first component will be resident at the user-end, in the end-user terminal, and includes the ability to compensate for transmission system latencies. A second component of the user interface will allow the particular service provider at the head-end to program a variety of situation-based responses for the user interface to enact when any communication latencies occur. The provision of these situation-based responses is possible because of the known values for the maximum latency of the repeating broadcast data stream, which is the maximum latency for the system. An overview for the user interface provides a programming navigation format through which the service provider can implement customized menus particular to the broadcast data stream.

Yet another component of the user-interface allows for the recording and storage of user-preferences based on repeated inquiries to the system.

Through use of the broadcast streaming feature, data compression and the service navigator, the user is provided with a fully interactive experience while the stress on the head-end and communication overhead is limited. Hence, the number of video servers required at the head-end is reduced, while the latency of the system is made predictable. Thus, the system of the present invention provides superior navigation to television viewers as they cope with the great number of choices available to them while reducing the hardware overhead required for system navigation.

Additionally, while using digital media objects transmitted in a compressed format, the user is provided with a seamless viewing experience nearly equivalent to that presently experienced with analog signals. A plurality of such objects may be provided to the end user, thereby increasing the quantity of information that a user is exposed to, while allowing the presentation of such information to be manipulated in a common format and into a highly optimized manner for both the user and service providers. This advantage is provided through the use of a "smart" user end terminal, the user interface, and a "smart" service navigator, as will be hereinafter described. The system of the present invention therefore presents a commercially viable improvement to existing interactive television approaches.

Figure 2:
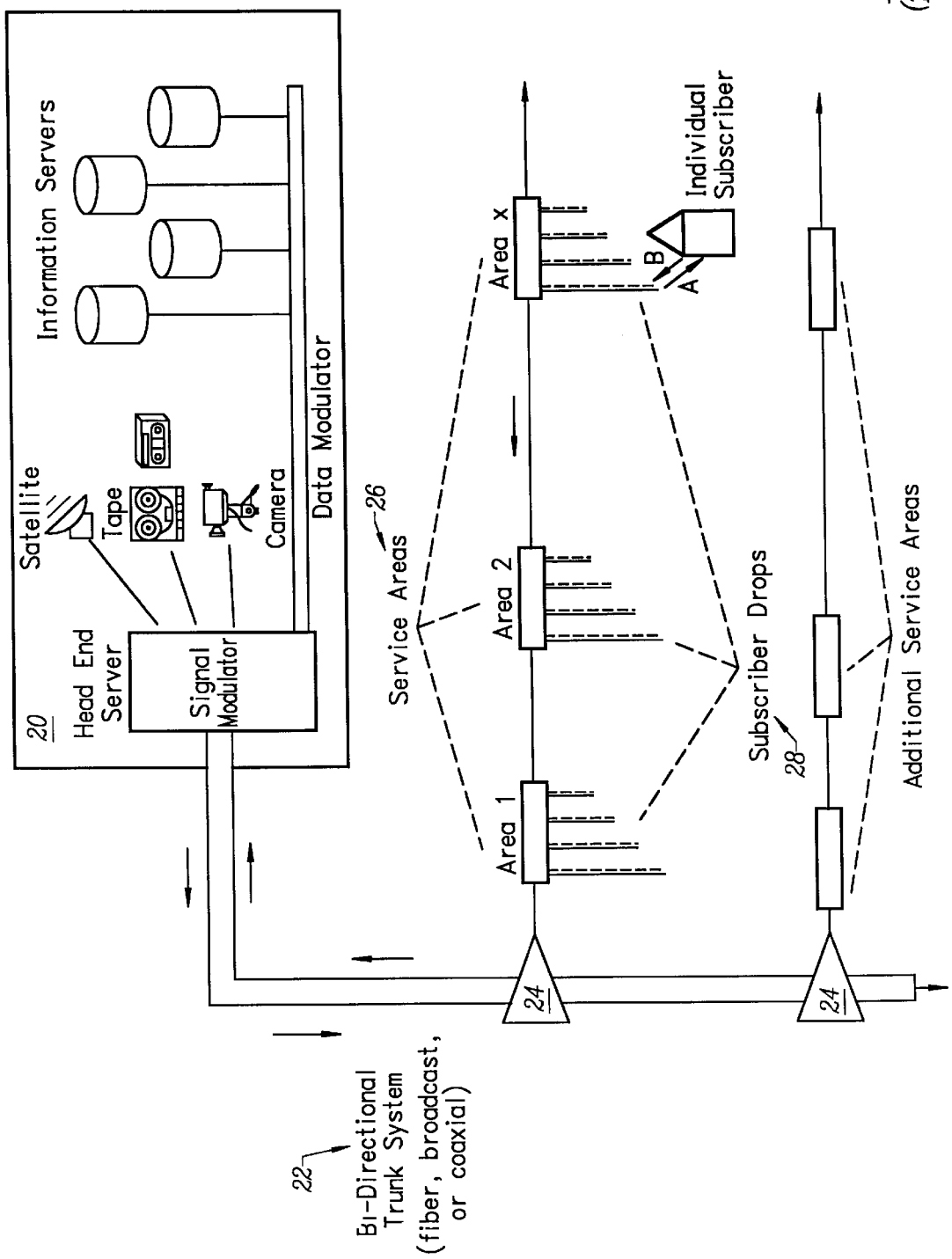
FIG. 2 is a block diagram of a communications medium suitable for use with the information delivery system of the present invention.

In the transmission system shown in FIG. 2, the head-end server 20 is utilized to encode and transmit a plurality of media objects into the data stream into the trunk system. Each media object conforms to a specific model representing composition of various media types, such as video, still pictures, background artwork, music or text. Using each of the media objects, complicated structures can be built from easy to manipulate and simple to define components. Each media object embodies a broad set of functionality requiring minimal effort to construct useful visual, auditory, and sensory output for the user interface.

Each object can comprise data which is provided to the "smart" terminal to define the information which is to be placed in the user interface and displayed to the user, information for the user interface as to how the object should be depicted by the user interface, any information regarding elements for controlling the object (such as buttons, visual gauges, etc.), and code which controls the behavior of the object in the form of scripts or embedded code contained by the object.

Each media object may comprise, for example, an electronic program guide, a short video clip of a video on demand program, or other information which is designed to be a control mechanism for other objects. In such a delivery system, the communications load on the system relies substantially in the transmission of data and images to the network, thereby minimizing backchannel communication.

Figure 3A:
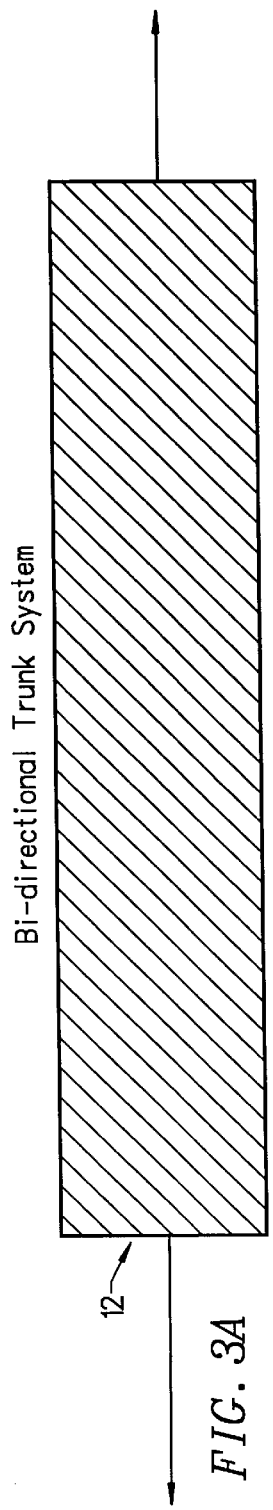
FIG. 3A is a diagram of a bi-directional trunk system shown in FIG. 2.
Figure 3B:
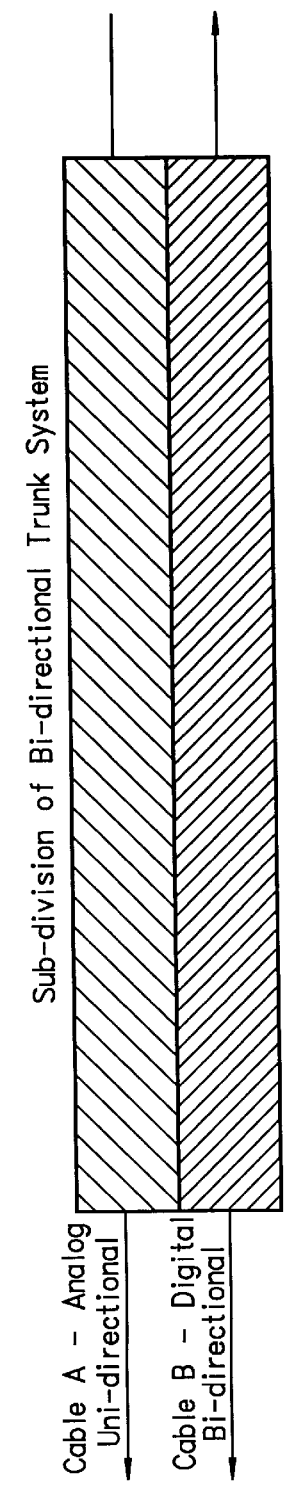
FIG. 3B is a diagram of the subdivision of the bi-directional trunk system shown in FIG. 3A.
Figure 3C:
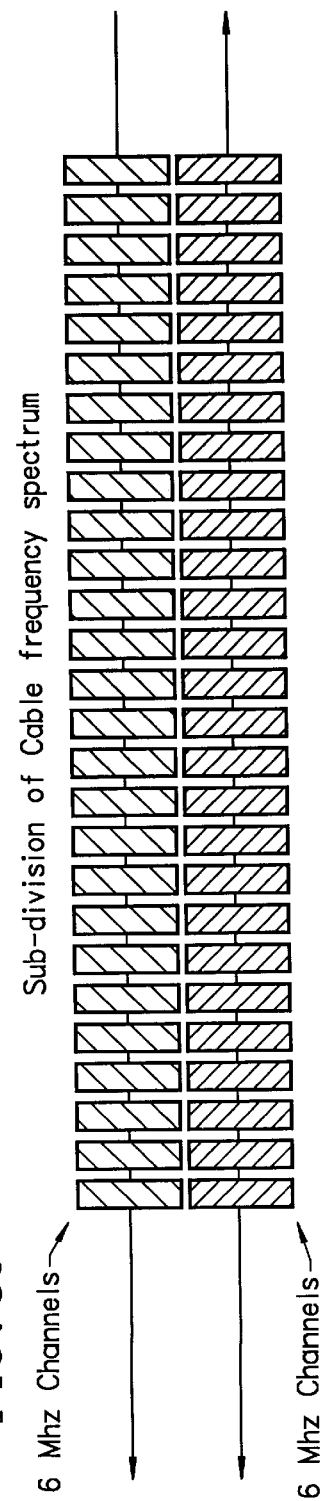
FIG. 3C is a diagram of the frequency spectrum of the sub-divided bi-directional trunk system shown in FIG. 3B.

FIGS. 3A–3C show a block representation of the bi-directional trunk system in use in the U.S. West trial. As shown in FIG. 3B, the trunk system is divided into a uni-directional, analog "A" cable and a bi-directional, digital "B" cable. As shown in FIG. 3C, each cable includes a number of 6 mhz channels which transport the data utilized in the system of the present invention.

Figure 4:
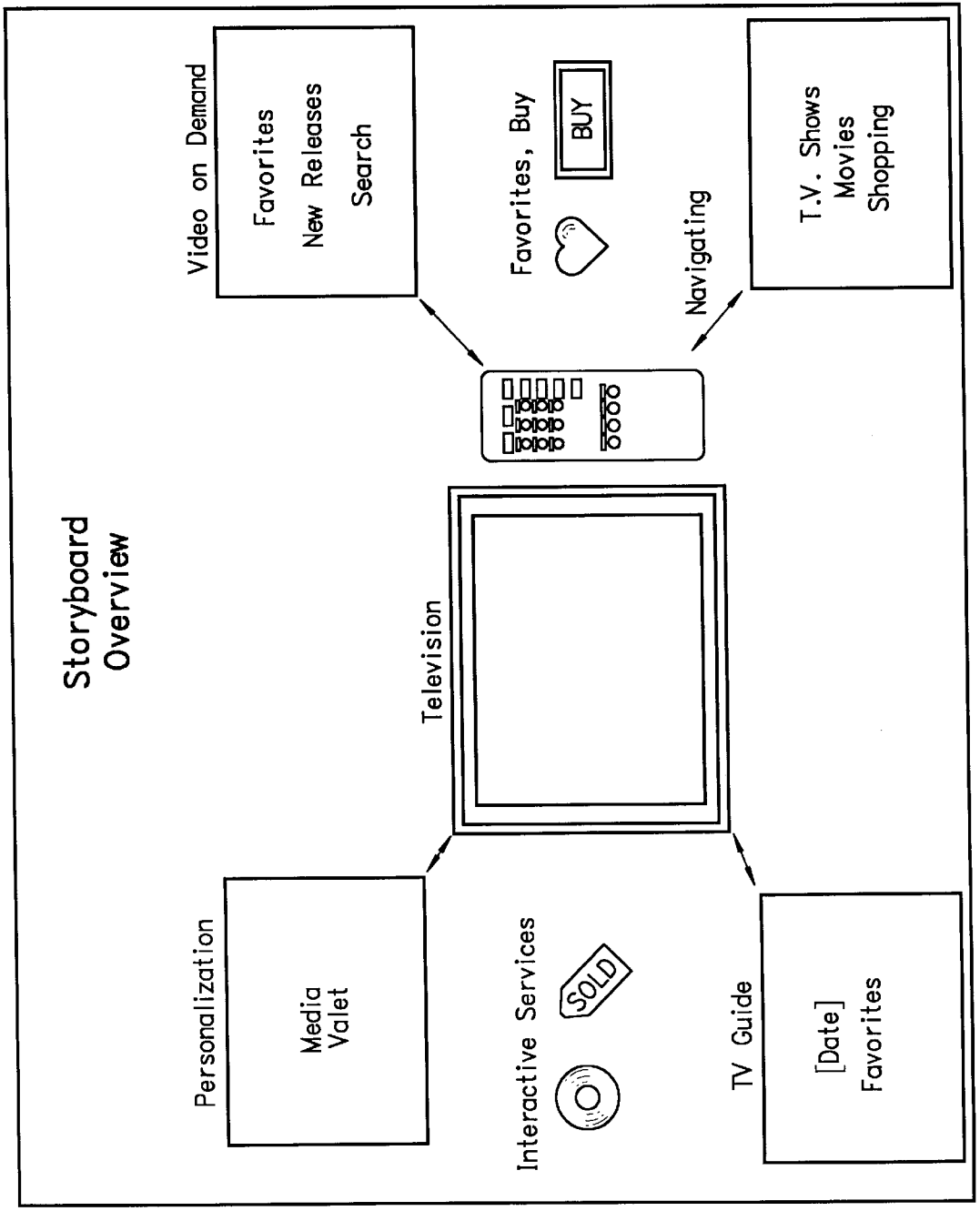
FIG. 4 is a representation of an exemplary interface screen which may be provided by an end-user terminal to a user.

The novel user interface and service navigational scheme of the present invention will be described with reference to FIG. 4. FIG. 4 shows components of the user interface, comprising an overview of an interactive interface screen with various different media objects placed thereon. As shown in FIG. 4, typical media objects represent icons for a "media valet," a TV guide (an electronic program guide), a video on demand guide, and a navigation guide. Standard broadcast television can also be provided in a window with a media object used to overlay the picture with current information about the program.

The user interface is designed to provide viewers with optimum choice, but not to overload the user with too many choices which will drive the user to avoid using the interface because he/she is overwhelmed. The interface is designed to leverage itself off what the viewing public currently experiences—integrating new experiences around viewers' existing experiences. The user interface of the present invention uses the predictable response times of the broadcast data stream to offer interactivity to the services offered by the information providers through a consistent look and feel.

The user interface of the present invention is highly visual. The interface items are depicted by representations of themselves. For example, movies can be represented by poster art, and services can be represented by the service logo. As such, the viewer can instantly comprehend the hierarchy and array of items available.

The interface incorporates graphics, music and transition effects which have a quality similar to or equal that of a television picture. By animating the visual display, the display is never idle when waiting for viewer input. Furthermore, the interface provides a navigation platform that may be utilized across different service providers. A standard paradigm provides a singular visual understanding of the categories and hierarchy of items which are available. In one embodiment, the paradigm comprises an organization wherein one moves vertically on the screen to choose between higher level categories, while one moves horizontally to select within the category. As such, more than one menu can be displayed at a given time, and the viewer is less likely to get caught in layer upon layer of menus.

Furthermore the interface is designed to be expandable, so that as more services become available and more programming is offered, they can be easily added to the interface by adding different media objects to the data stream.

A further unique aspect of the interface is the provision of a smart service navigator or "media valet." Through the use of intelligent filtering and weighting algorithms, the interface can be personalized for each viewer household. The media valet acts to record viewer preferences based upon any number of algorithms which can not only record preferences, but make suggestions to the user for programs which the user may find similar or interesting, based upon the viewers recorded viewing habits. For example, the service navigator may note that the viewer tends to view movies in a particular genre with a particular movie star. When a new listing of a movie which fits a similarity profile becomes available, the valet may suggest this option to the user.

The service navigator may be programmed by the user for specific preferences, however a unique aspect of the invention is the that the navigator make such interpretations without any more user input than that required by the user in selecting programming. Such suggestions by the navigator may be automated so that the navigator provides suggestions each time the system is activated, or the suggestions may be provided by a specific user request.

The navigator may be implemented in a manner currently similar to conventional "agency" software. For example, certain types of searching tools currently available for the internet utilize a vector analysis technique wherein a vector map is calculated for each item which a particular user selects as part of a search. Thereafter, when a search for similar items is desired, the software calculates a vector map of the search items and compares this map with the map representing the average of the user's past selected preferences. Only those search items which fall within a certain limited variance from the user preference map are then presented to the user. Applying this technique to the present invention, the service navigator would read and calculate a vector map for each of the selected items which a user views over a given period of time. Thereafter, each time the selection guide is loaded into the "smart" terminal, the navigator can perform an automatic or user-prompted search for similar items, and provide those items to the user.

Yet another aspect of the interface and navigator is to provide interactive programming accessibility through an electronic program guide. The electronic program guide can be made to show the interactive services, such as home shopping and video on demand, as regular broadcast channels in the television line-up, and thus a coherent paradigm is maintained for all services.

An example of how each of the objects shown in FIG. 4 would be used is as follows.

In the television window, the normal broadcast channels may be scanned in a conventional manner by using channel-up and channel-down buttons on a conventional or customized remote control. An advantage of the transmission system of the present invention is that information regarding the station, the length of the program, and the title of the program, can be overlaid on the television broadcast picture using media objects supplying such information which are provided in the data stream.

The overlay can also display tie-ins to other interactive services in the program.

The navigation field can display media objects such as a rotating globe (or any other visual representation), having different categories shown thereon which represent the different programming areas available from the service providers. In one example, the globe could rotate to show different menu items, and posters of each of the particular broadcast or service choices. In this example, the broadcast and service choices could be video objects of the actual images being broadcast at that time on the system. A preview clip of movies and shows can also be shown by directing a pointing mechanism and clicking on the appropriate indicator, and further information regarding each of the services is thereafter provided to the viewer on demand by downloading one or more additional media objects from the data stream. A similar interface can be provided for the video on demand menus. Posters can be shown for the different titles, a preview clip can be requested, and an interactive "buy" button tie-in used to allow the user to purchase a particular video.

The program guide interface can display programs in the current time period, and other time periods, again using a globe or other suitable graphical representation for an interface. The TV guide offers an alternative to scanning channels to find a particular program. Scanning can be incorporated into the guide and customized to implement scanning by time period, or by other additional information available for each program (or service), such as length of running time and/or program stars.

A second aspect of the invention, the broadcast streaming approach provision of data to the end-user, will now be described with reference to FIGS. 5–8.

The broadcast data stream contains all information that the end-user terminal needs to provide basic services for interactive video delivery service. Such basic services could include the electronic program guide (including up-to-date programming information for all available video programming from the head-end); a service navigation system (the "media valet"); and the user interface overview, to provide consistent look and feel across each of the various available services. It should be noted that not all of the information in the broadcast data stream will be required by the end-user terminal at any given time. Indeed, the repetition of the broadcast data stream allows the end-user terminal to select whatever information is needed at a given time. The end-user terminal contains means to decode and decompress the signal, and provide the signal to the user interface. An end-user terminal suitable for use with the information delivery system of the present invention is disclosed in co-pending U.S. patent application Ser. No. 7/970,308 entitled Audio/Video computer architecture, and commercially available as the "REAL 3DO Multi-player System" developed by The 3DO Company and manufactured by Matsushita.

The aforementioned end-user terminal includes a cache memory (see FIG. 7) to which components of the broadcast data stream may be downloaded. The structure of the data broadcast stream is well defined to allow the end-user terminal to cache information as required and remove information from the cache in a seamless manner. Information is then retrieved from the end-user terminal's memory cache, or the broadcast stream, before any request is made to the head-end server on the backchannel. By using a sophisticated end-user terminal, such as the 3DO Multiplayer, in conjunction with the broadcast stream, the viewer can manipulate basic services, such as scrolling through program guide, to determine what programming from the head-end server the individual subscriber desires to view at any given time. The server is therefore not required to continually respond to requests from a number of different subscribers at any given time to conduct repetitive, high-overhead, non-revenue generating activity. The broadcast data stream contains all the necessary information to allow the viewer to utilize the basic services without placing any overhead, other than that required to generate and maintain the broadcast stream, on the server.

In a further aspect of the invention, the broadcast data stream may also include boot code for the end-user terminal. Where the boot code is included in the broadcast data stream, connection storms can be eliminated in the situation which, for example, occurs after resumption of service after a power outage where a number of users will simultaneously request services at the same time. Upon re-initiation of the broadcast data stream, the boot code is provided as a component of the stream to the end-user terminals, and there is thus no requirement for immediate backchannel communication from each user on the system to the head-end server.

General technical assumptions for various particular media objects are shown in FIG. 5. Each assumption defines the average size and bit requirement for each particular object. As shown in FIG. 5, seven types of media objects are contemplated: object code (for the boot code), text, music, still photos, animation, fonts, and short video. Thus, all of the object data could be repeated within the stream with a less than one second period of latency.

FIG. 6 represents the media objects which are required for the user interface and which must be provided to the end-user terminal. The data stream contains media objects for each portion user interface that makes up a set of services which, in a given embodiment, may be considered basic interactive services. As shown in FIG. 6, these basic service interfaces should comprise: a Help And Tours interface; a Video On Demand interface; a Pay-Per-View (PPV) Events interface; the Electronic Program Guide (EPG) interface; a User Preferences interface; a Check Reservations interface; and an Advertising interface. In alternative embodiments, an "expanded" set of services would include additional interface objects, such as a Bulletin Board interface; a Guest Services interface; a Games interface; an Education interface; and a Reference Materials interface.

FIG. 6 shows the number of media objects required for interfaces to basic services and for additional services, and the amount of storage required by all media objects. As an example, consider the electronic program guide media object defined in FIG. 6. The electronic program guide requires one code module, one background photo, one piece of animation, one thousand text objects, one background music object, and one specialized font object for the EPG interface. It should be noted that objects for the additional services could be provided on the same broadcast stream as data stream, or may be provided on a separate, alternative 6 mhz channel. These interfaces are included in FIG. 6 to demonstrate the feasibility of using a broadcast stream with a 6 mhz channel including those interfaces for both the basic services and additional services.

Figure 7:
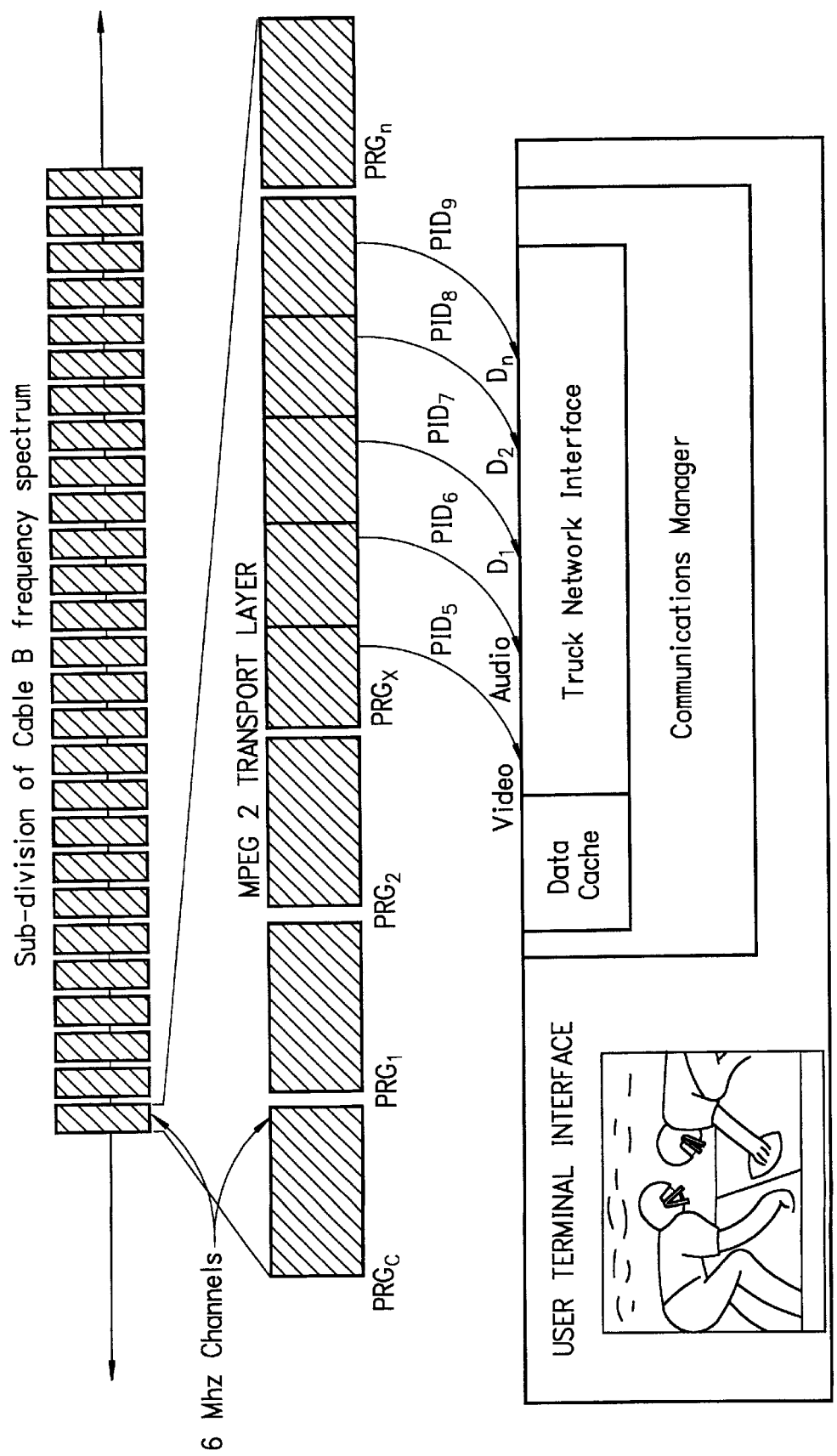
FIG. 7 is a block diagram showing the interaction between the MPEG2 transport layer and a network interface in a user terminal.

FIG. 7 is a depiction of the interaction of the MPEG transport layer, the end-user terminal 100 and a network interface 110 in the end-user terminal. The user terminal 100 includes the network interface 110, data cache 120 and a communications manager 130. In operation, the output of the head-end for the broadcast stream would use the MPEG-2 transport layer to transmit the media objects to the end-user terminals 100. The network interface module 110 within the user terminal 100 is used to parse the broadcast data stream for desired information. Media object calls are utilized to request information which is read by the network interface 100 and deposited into memory hardware 120 within the user terminal.

The MPEG-2 transport layer uses the model of sending programs or program information description ("PID") packs. In this model, programs are treated as related groups of elementary streams. In the U.S. West test, transport layer hardware (manufactured by Scientific Atlanta) supports four elementary streams per program. These streams are designated for video, audio, and two private data channels, as illustrated in FIG. 7. Each elementary stream is assigned a program information descriptor (PID). Each PID is referenced by a number $PID_n$. $PID_0$ is reserved and contains a directory of all programs. Each program is referenced by a number $PRG_n$ and a two-stage mapping through $PID_0$ and the program map PID is done to obtain the information contained within the program.

The program reference number $PRG_0$ contains a directory used to map the naming convention used to request a specific interface to a particular $PRG_n$. The format of the data in the $PRG_c$ is completely independent from formats used by the MPEG transport layer or $PID_0$.

When the user terminal 100 is brought on-line, such as at power up or by a specific selection by the user, the boot code contained in the data stream is provided to the user terminal. The end-user terminal 100 will interpret the boot code, and initiate a boot process to start the terminal. Once the booting process is completed, a digital tuner (not shown) in the user terminal 100 will tune-in to a pre-selected, default frequency of the broadcast data stream. The particular frequency can be embedded in the boot code, or can be provided in a separate function call to a "Level 2" server which is providing the broadcast data stream. Alternatively, the control channel with the broadcast data stream could be used to request a continuous feed session from the communications manager, and the digital frequency for the broadcast data stream would be returned during the session initiation. This allows the location of the broadcast data stream to be moved dynamically or requested on demand.

The system reserved program reference number $PRG_c$ is then read to obtain the directory of the program information descriptor (PID) packs that describe the location, within the broadcast data stream, of the different user interfaces defined by the service providers. The PID packs may follow the hardware standard set forth by the hardware provider (Scientific Atlanta hardware in the U.S. West embodiment), and may be designed to follow any particular hardware of the particular communications network in use. The system reserved program reference number $PRG_c$ is then stored in the user terminal's internal memory.

Changes to the user interface are supported by dynamically changing the PIDs for an interface during transmission of the broadcast data stream. These changes should occur after user terminal 100 has stored $PRG_c$. Thus, during idle periods, user terminal 100 re-reads $PRG_c$ to obtain any changes in the PID mapping. Alternatively, a well-known mapping scheme between a particular $PRG_n$ and the user interface could be used, therefore not requiring $PRG_c$ to be read during each idle period. This alternative approach sacrifices making dynamic changes to the PIDs.

The user interface can also include transition effects, which allow seamless transition between different user menus and interfaces. A media object for the transition effects, $PRM_{tc}$, is located within $PRG_c$ and a request is made to network interface 110 to load the PID pack. The transition effects are stored in user terminal 100 in anticipation that the viewer will require use of these effects first.

A media object for the electronic program guide, $PRM_{epg}$, is located within $PRG_c$, and a request is made to the network interface to load the PID pack. Within 2.3 seconds, the average latency time as noted above, the EPG interface is loaded into the user terminal 100 and may be presented to the viewer. When the viewer requests either the EPG or the necessary information will already be loaded into user terminal 100 for provision to the user.

Note that user terminal 100 may utilize the transition effects between screens during the latency period. In essence, the viewer sees a seamless interface transmission, and to the viewer it appears that the system is interacting with the host to obtain the information requested by the viewer. Thus, the latency period is less noticeable to the viewer as the particular transition effects provide video, audio, or other information to occupy the viewer during the latency period.

A session with the broadcast data stream will remain active until the digital tuner is required for other purposes.

An example of the response of the system to a particular user request using the example of a user request to a main menu screen is as follows. When a viewer wants the main services menu, a media object $PRM_{main\ menu}$ is located within $PRG_c$. The digital tuner, if tuned to an alternative digital frequency as discussed above, can be retuned to the data stream. A request is made to the network interface in the end-user terminal to load the main menu PID pack. A graphic or animation object is then used as a transition to the new interface, thus masking the latency and the potential re-tuning to the broadcast data stream. Within an average of 2.3 seconds, the interface is ready to be presented to the viewer. The previous EPG data is held in memory cache 120 in user terminal 100 as long as possible before being expunged from memory. Alternatively, the information for the main menu could have been located in memory cache 120 if it had previously been used, thus avoiding the data stream access.

Should the viewer want video on demand data, the operation would be similar as that described to the main menu function. The media object for the video on demand, $PRM_{vod}$, is located within $PRG_c$. The digital tuner, if necessary, would be re-tuned to the broadcast data stream, and a request made to the network interface to load the video on demand PID pack. When a selection is made by the user based on the information provided in the PID pack, the digital tuner can tune to an alternative channel where the video on demand will occur.

Such media objects for VOD can include $PRM_{vod}$ posters, which can include a set of posters representing the different movies available on video on demand. The media object can also include $PRM_{vod\,previews}$ which can include a short video clip of the movie which is available in the video on demand service.

Bandwidth management and selection of media objects from the MPEG-2 data stream are handled by calls to network interface 110. The throughput from the network interface should be sufficient to handle the data rate for the PID packs for the user interfaces. Likewise, the data requirement from the PID packs from the interfaces should not exceed the range of the network interface. (Both criteria are met using the aforementioned 3DO Multiplayer as the end-user terminal.)

The potential does exist for data to be missed by the end-user terminal. In such cases, because there is no communication from the end-user terminal to the head-end server, the end-user terminal must delay for the worst case latency period until the missing data appears in the data stream.

The service system models set forth above give rise to a number of variations which are considered to be within the scope of the invention.

In some embodiments, interactive services which will utilize even greater degrees of backchannel communication to the host head-end, can also be included. Nevertheless, even in embodiments where significant backchannel is required to provide information to the head-end, one or more alternative streams can be provided by the head-end server to include such information as, for example, the Sears, Roebuck & Company catalog. Again, such a broadcast channel would operate under the same principles set forth herein, wherein all the information which is required by the user to browse through the particular selections can be provided continuously on a repeating data stream. The user terminal will then extract from the data stream based on the interfaces supplied by the service provider, in this case Sears, Roebuck & Company. In such instances, again, the backchannel is reduced to that required for ordering specific components from the service provider. In the Sears, Roebuck example, the only overhead which is required by the service provider is the provision of the transmission bandwidth and the overhead at the server.

While the interface shown in FIG. 4 represents one example of a user interface screen which may be incorporated as part of the present invention and utilized with the broadcast streaming approach, other types of interface screens, which do not use iconic representations of media objects, may be utilized within the context of the present invention. The system includes the capability to incorporate real time images as part of the viewing experience. For example, service providers whose main business consists of retail clothing sales may wish to display goods available for retail purchase in a representation which presents the user with an example of how such goods would appear in a real world situation. A clothing manufacturer may wish to show off a new collection by, for example, showing a scene where the clothes are worn by individuals at a social function, such as a cocktail party, allowing the viewer to see how the clothes appear in one environment in which the clothes might be used. If the user wanted further information on a particular item, the user could direct a cursor (using, for example, a remote control) to "click" on the particular item of interest and additional information about the item could be displayed. The foregoing example is merely one of the many types of interactive means a service provider might utilize with the interface of the present invention. Since the media objects may be manipulated by the service providers, the appearance of the interface may be customized for individual service providers on a desired basis.

Another example of the contemplated uses of the interface in conjunction with the broadcast streaming approach include the provision of a "barker" mode in which advertising objects can be inserted into the stream and displayed to the user without user interaction. (A "barker" is a person who advertises by hawking at the entrance to a show.) In this case, the barker mode could be active and utilized with either the user interface discussed with respect to FIG. 4 or the real-world interface example set forth above. In either case, the advertisement can be output to the viewing screen as a tease to the viewer regarding a particular product or service.

The barker mode can be tied into the smart service navigator. For example, the service navigator can record the types of products and services which the viewer purchases through on-line services, and/or the advertisements or products which the viewer may select, over a period of time, to view more information on. This file may be sold by the cable provider to service providers, or may be user controlled, so that the user has the opportunity to sell access to the viewer's own preferences to the transmission provider or the service providers. The barker mode could also be viewer controlled to prohibit such advertisements from appearing on the viewer's individualized user interface. The information gathered by the service navigator could also be utilized by the service providers to provide viewer or group specific programming.

Still further variations of the system of the present invention exist with respect to the smart service navigator. For example, the service navigator itself need not be limited to a service navigator which is provided by any one source, such as the transmission provider. Second source providers could develop customized, field optimized navigators for particular fields of interest, such as movies, commerce, or television.

In addition, in a further variation on the information gathering concept set forth above with respect to the commercial service providers, the navigator may gather general information feedback on viewer habits, and such information can be used by the service providers to optimize system broadcast performance. For example, if the service providers know that viewer demand for a particular program is greatest during a particular period, the provider can adjust program scheduling accordingly. This information could also be used to assess the number of viewers utilizing a particular service, and the frequency of such use, when determining revenue issues between the transmission provider and the service provider. Thus, the system of the present invention provides a mechanism wherein the broadcast system can be optimize information transmission by compensating for heavy load demands on the head end of the system.

Still another variation on the use of the service navigator includes allowing the navigator to continue operating in the background, while the viewer is engaged in viewing a currently running program, or while the viewer's television is off, while the viewer is away from the home, etc. In this mode, the smart navigator may be acting on behalf of the user, selecting, sorting and queuing information for the viewer when the viewer returns. As will be readily understood, this mode of the smart navigator could be combined with a "barker" mode wherein when the viewer returns to view the system, those programs of interest can be relayed to the viewer.

Other variations of the various examples set forth herein are contemplated for use with the present invention, and are considered to be within the scope of the invention.

It should be noted that the particular user terminal which is required for use in the system is also independent of the system architecture. While the architecture described herein has been set forth with respect to the interactive game system produced by The 3DO Company, the system would work equally as well with hardware from various vendors, and personal computers such as the Macintosh and PC-compatible computers. With each different embodiment of hardware, different data types would comprise the different media objects, each data type being specific to the particular platform.

FIG. 8 shows the size requirements, overall bandwidth requirements, and transmission times, for each user interface, and the worst case latency (equal to the total period for repetition of the data stream) for the system as a whole. As shown therein, the total required bandwidth (basic and additional services) is 93.2 megabits, or 3.84 seconds. Thus, 3.84 seconds defines the worst case latency for the system, with the average access time required to obtain a particular piece of information being 1.92 seconds. The interfaces beyond those of the basic services account for 37.0 megabits of data or 1.5 seconds latency.

Thus, for a stream that supports only the base services, and given the 27 Mbps bandwidth of the U.S. West environment, the bit requirement on such a system would be 56.2 Mb, or a worst case latency of 2.3 seconds. This means that an average access time to information would be half of 2.3 seconds, or 1.15 seconds.

In the embodiment set forth above where the end-user terminal 100 contains a cache memory 120, information could be cached in the end-user terminal for one or more previously-used interfaces to provide rapid access without using the broadcast stream. It should be noted that the system of the present invention may be utilized in combination with any amount of backchannel communication from the user terminal, for example, for use in selecting different services such as pay-per-view, home shopping, and interactive games. However, the data stream includes all necessary media objects which are required by the subscriber to obtain information about the various services available from the service provider. Once the viewer decides upon a particular service or program, the viewer can make a selection, and only at that time does the viewer make use of the backchannel to the head-end. Note that the function selected can be provided on a separate, 6 mhz broadcast channel, and that the user interface can include the necessary instructions to have the user terminal re-tune to a different broadcast channel to access the service. Alternatively, additional broadcast data streams can be provided on other broadcast channels, with objects for specific services on that channel, the user interface and terminal can begin decoding in a manner that is transparent to the viewer.

In still another embodiment of the invention, the system can be utilized with low bandwidth transmission systems. A storage medium can be provided at the user-end of the system, and information which might otherwise be provided as media objects in the stream can be stored on the disk and accessed by calls from objects in the stream. In this variation, the amount of information provided in the stream versus the amount of information provided on the storage medium can vary, depending on the particular application. The storage medium could comprise, for example, a computer's hard disk, or a CD ROM. In a practical example, a catalog distributer of retail items may desire to provide a separate broadcast data stream, but the amount of information necessary to input into the stream may be prohibitive. In such a case, the distributor could store on a CD ROM a number of the media objects normally input into the stream, such as particular items of clothing which the distributor will carry for a long period of time, or other presentation objects such as backgrounds, music, and animation, which the distributor will use on a repeated basis to present items to the viewer/consumer. The information on the CD ROM can be updated periodically, by distributing additional disks, but the information on how the stored data is to be manipulated can be dynamically updated almost instantly from the data stream. The data stream can also include price information, special sale information, and "barker" instructions. In this embodiment, significantly less bandwidth is required to provide the user with a great deal of information.

Figure 9:
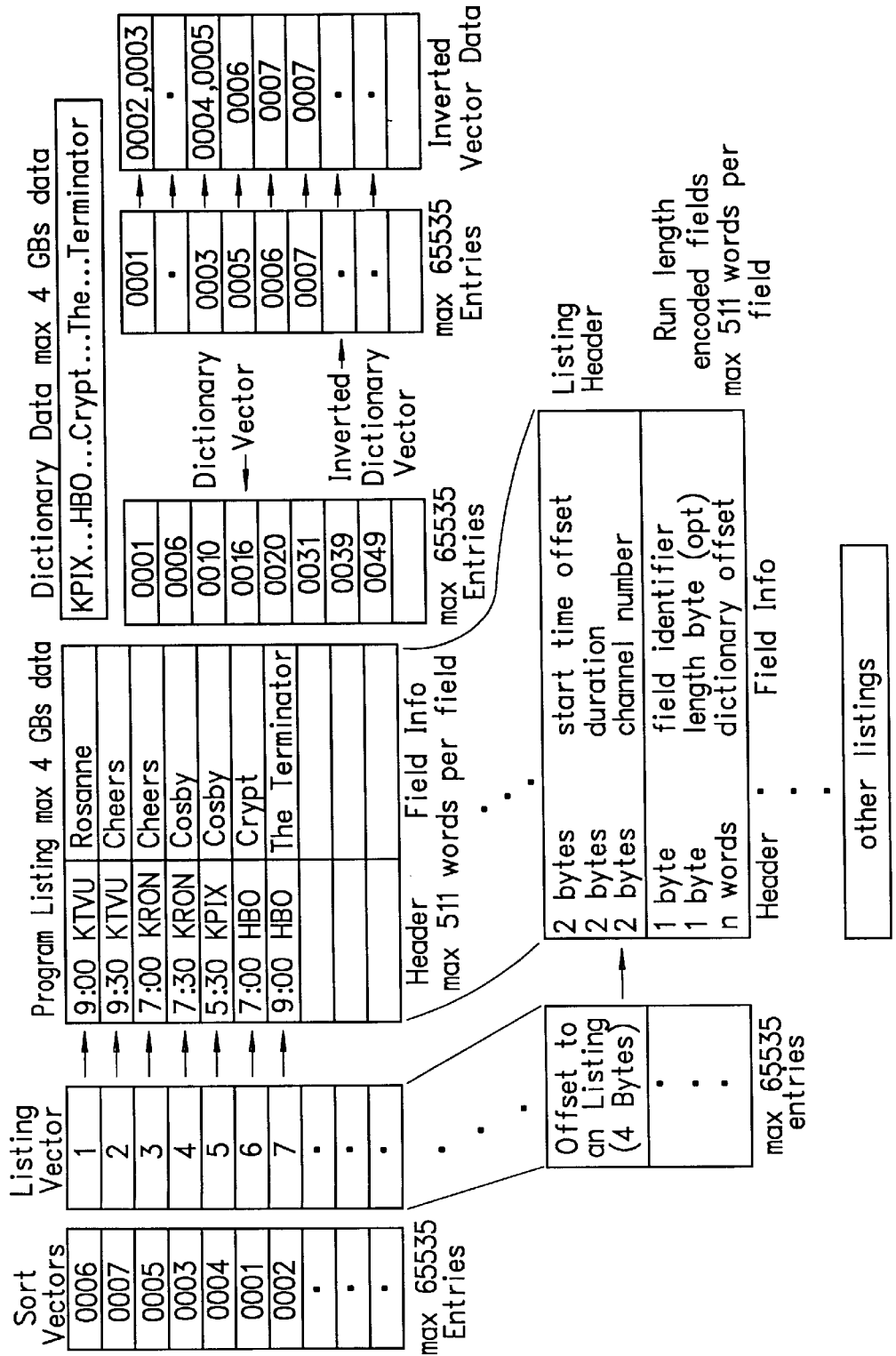
FIG. 9 is a depiction of the encoding scheme for the electronic program guide of the present invention.

A further aspect of the present invention is the manner in which the information provided via the broadcast data stream is manipulated by the end-user terminal in the system. FIG. 9 is a representation of a novel method of encoding information for use with the end-user terminal in the system of the present invention.

Certain end-user terminals suitable for use with the present invention will have a limited memory capacity. In such cases, some form of compression or encoding of the data to be stored in the memory is desirable, however such compression or encoding should not adversely affect the response time of the system.

As noted above, one feature of the system is to provide superior navigation to television viewers. In accordance with this object, superior use of the information database provided by the service providers may be made in the system by providing additional information infused with the information from the service providers. In one aspect, each service provider's database can be extended with additional fields and information licensed from other providers, which then can be integrated with the information provided from the service provider. Such information can include demographic information, ratings, etc. Further, through the use of encoding techniques and delivery protocols, the end-user terminal can be instructed to store user databases and memory and perform efficient searches without access to the server or via a backchannel communication scheme. Information captured from viewers while using the information system is used to provide assistance to the viewer in the future. As noted above, the "media valet" can provide choices to the viewer that are tailored to past interests and habits.

In accordance with these objects, it is extremely desirable to store the EPG and other databases in the user terminal for use on an "as-needed" basis. This guarantees predictable and rapid response to requests made by the viewer in the situations where the viewer is watching television and requests information, the viewer scrolling through the EPG, or the viewer is browsing through pay-per-view and video on demand listings.

In storing the essential databases for use with the system of the present invention, the electronic program guide, the video on demand database, and the pay-per-view database, an understanding of the storage demands of such databases is required.

As an example of the encoding scheme of the present invention, the electronic program guide database specification and requirements are hereinafter described.

The amount of data used to represent seven days of electronic program guide listings is approximately 1.70 megabytes depending upon the programming appearing during the week. These are the storage requirements for data supplied by the Tribune Media Company for programming in the San Francisco Bay Area.

The electronic program guide and video on demand data includes the following information: start time; duration; title; channel; description; subtitle; part sequence; actors and directors; genre; year; rating; warning; category; short movie description; and long movie description. The specification of 1.70 megabytes of data is a specification for raw text with embedded tags to designate different data fields. Indexing and searching structure is not included in the text size. 1.7 megabytes of text is approximately equal to 8,761 program listings at 193 bytes per listing. An index for the electronic program guide is larger than the electronic program guide itself, occupying 1.96 megabytes. This full text index is used to search arbitrarily for words in the electronic program guide. This also assumes 48 cable channels: comprised of 21 network channels and 27 cable channels. The cable channels, while having more bytes per listing than network channels, have fewer listings due to generally longer program times. As a result, the total memory requirement to store searchable, weekly electric program guide is 3.7 megabytes.

Because this may be beyond the memory capacity of many of the user terminals suitable for use with the system of the present invention, an encoding scheme may be utilized to reduce the storage requirement for the electronic program guide data set.

Several alternatives for this encoding scheme exist. The first alternative is to reduce the amount of information used in the electronic program guide. For example, the minimal electronic program guide could comprise data for the start time, duration, title, and channel. This reduces the memory requirement, but sacrifices most of the descriptive information and would limit the amount and quality of the information provided to the viewer in the media valet. A second alternative is to create an algorithm that stores the reduced data set from the first alternative in the user terminal and simultaneously generates a request to the Level 2 service provider's gateway for more detailed information. This provides a limited yet rapid response to the viewer's request with the gateway providing the detailed information. This creates a multi-mode situation in the interface, where the user would have an immediate response with limited information, with detailed information appearing later depending on the response time of the gateway.

Another alternative is to use a smaller data set. A window of time can be chosen in which sub-sets of the entire electronic program guide (i.e., a daily electronic program guide or an hourly electronic program guide) are saved to memory. This would give the user full information immediately for the current time window, but sacrifice the viewing and potential recording of future programming without first accessing the server or communication channel.

Still another alternative is to use a single communication channel to query a server resident database. This places all the database information on the server and frees memory space in the end-user terminal. However, the network must now handle more traffic for browsing activity done by the viewer. It also requires a response from a Level 2 gateway that is timely and consistent to provide rapid response to viewer requests.

Still another alternative is to store a compressed version of the electronic program guide in the end-user terminal. Using LZW compression (a common compression technique) on the electronic program guide, the data size of the electronic program guide can be reduced from 1.7 megabytes to 509 kilobytes. At these data sizes, a conventional end-user terminal suitable for use with the system of the present invention could store the data, but neither of the techniques allows selective decoding to access only a portion of the information. The entire electronic program guide would have to be decompressed before the data could be accessed. This decompression time would add to the overall system latency and would require the end-user terminal to store the decompressed data.

Finally, the electronic program guide information can be encoded into a data structure that uses a dictionary format and which relies on the redundancy of T.V. data to reduce its overall size. This would remove the redundant use of words and phrases from the electronic program guide to achieve storage savings. The dictionary format could provide sufficient savings to store the electronic program guide and a searching structure within a limited storage capacity available on such conventional end-user terminals. Ideally, the savings achieved by encoding this information would rival the savings achieved by the LZW compression.

However, unlike the compressed formats, the encoded format can be used directly to create text displays and perform searches.

An encoding scheme in accordance with the present invention is shown in FIG. 9. The program listing contains an array of offsets to the dictionary of terms utilized to build the EPG. A listing vector contains offsets to the program listing structure for each program listing. The offsets are 4 bytes that allow 4 gigabytes of data to be referenced. The vector has a maximum of 65,535 entries that can be referenced by using 2-byte offsets into that vector. A sort vector contains sorted 2-byte offsets to the listing vector. There may be many sort vectors constructed from fields in each program listing, for example, by sorting by title, sorting by channel and time, etc. A binary search (a common searching technique) can be used to locate the particular program listing through the appropriate sort vector. The sort vector shares with the listing vector the same maximum of 65,535 entries that allows all listing vector entries to be referenced.

As shown, the Program Listing structure is comprised of a listing/header and Run Length encoded fields. Some electronic program guide information that is common to all listings will be quantized into the listing header. All other information appearing in the program listing will be represented by a field I.D., a length, and a series of 2-byte offsets to the dictionary vector. To locate a particular field I.D., the listing headers would be traversed until the field I.D. is located.

Finally, a dictionary is shown which contains all the words found in the electronic program guide. Frequent phrases are also encoded into the dictionary to take advantage of the redundant use of program titles and descriptions. The case of the words is maintained in the dictionary, and punctuation is also entered with the words. This allows the dictionary to faithfully recreate a line of text with proper case and punctuation. However, original word spacing is not maintained. The dictionary is made up of two structures. The dictionary word table contains all the words, while the dictionary vector contains 4-byte offsets to the dictionary word table. This implies a maximum of 65,535 entries in the dictionary, and 4 gigabytes of dictionary data. Sort vectors can also be associated with the dictionary vector. (These maximum values are purely representative of this particular example.)

Using the proposed technique to encode the aforementioned electronic program guide for the San Francisco Bay Area, seven days of data can be encoded to a data space of 438 kilobytes including search indexes. Seven days of data now also comprises 8,761 program listings occupying a total space of 50 bytes per listing. The keyed search index necessary to create the electronic program guide display is 18 kilobytes. Each additional keyed index requires only 18 kilobytes. The index used to locate program listings where a given word appears would be an additional 289 kilobytes. This would be equivalent to the full text index described above at 1.96 megabytes. This index would answer such inquiries as searching for all movies by a particular actor, or all movies in a particular movie category type, such as comedies. The proposed encoded format is therefore a competitive one compared with the results achieved with the LZW compression on the original EPG text.

Additional improvements of the proposed format can achieve additional savings over the estimated 438 kilobytes. For example, were one to identify and remove additional redundant information, such as short and long movie descriptions which are essentially the same, would reduce the storage requirement by approximately 4% to 421 kilobytes at 48 bytes per listing.

In addition, one could reduce the information used in the electronic program guide. As set forth above, the minimal required electronic program guide information would be the start time, duration, title, and channel. This would reduce the storage requirement by 64% to 156 kilobytes at 17 bytes per listing. The time window concept described above as a stored alternative could also be used. A daily window would require approximately 22 kilobytes per day. To add back the description of information, the mixture of EPG information would become start time, duration, title, channel, description, short movie description and long movie description. This reduces the storage requirement by about 22% to 342 kilobytes at 39 bytes per listing. Using short movie descriptions instead achieves 26% savings to 325 kilobytes at 37 bytes per listing.

In addition, one could restrict the text used to build the full text index. Only those fields deemed important (i.e. titles, descriptions, actors) would be utilized. This would reduce the additional 286 kilobytes required for this index. Finally, the format used for encoding the electronic program guide can be matched with the algorithm used for compression. If data compression is used on the encoded format to reduce the electronic program guide bandwidth requirement, the format for the encoding could produce redundancies that the delivery impression algorithm could locate. This would produce better compression and result in additional time savings during delivery.

The video on demand and pay-per-view databases could be encoded using the same technique for similar storage savings. A sample from the video on demand data covering titles beginning with the letters "e" and "f" is used as an example. This would represent 2,837 listings or 1.3 megabytes of data at 442 bytes per listing. The proposed encoded format set forth above with respect to the electronic program guide reduces the storage requirement by 54% to 461 kilobytes at 162 bytes per listing. Extrapolating from the listings for the letters "e" and "f" to the full alphabet results in approximately 44,000 listings or about 7.2 megabytes of data. This memory estimate includes a single search index which could be assigned to any field comprising the video on demand data set. Each additional search index would require 88 kilobytes.

The intelligence of the user terminal could therefore completely relieve the Level 2 server from the task of database searching for the electronic program guide and video on demand database. If the Level 2 gateway instead sent those databases entirely through the broadcast data stream, the end-user terminal could perform the searches with predictable response times. If the video on demand database were encoded into a separate data stream, the delivery time for the video on demand information would be 2.1 seconds (assuming a 7.2 megabyte database transmitted at 27 Mbps).

The user interface is designed to provide viewers with optimum choice, but not to overload the user with a too many choices which will drive the user to avoid using the interface because they are overwhelmed. The interface is designed to leverage itself off what the viewing public already experiences—integrating new experiences around viewers' existing experiences.

The user interface of the present invention uses the predictable response times of he broadcast data stream to offer interactivity to the services offered by the information providers through a consistent look and feel.

First, the interface is highly visual, as shown in FIG. 4. The interface items are depicted by representations of themselves. For example, movies can be represented by poster art, and services can be represented buy the service logo. As such, the viewer can instantly comprehend the hierarchy and array of items available.

The interface incorporates graphics, music and transition effects which have a quality similar to or equal that of a television picture. By animating the visual display, the display is never idle when waiting for viewer input. Furthermore, the interface provides a navigation platform that may be utilized across different service providers. A standard paradigm provides a singular visual understanding of the categories and hierarchy of items which are available. In one embodiment, the paradigm comprises an organization wherein one moves vertically on the screen to choose between higher level categories, while one moves horizontally to select within the category. As such, more than one menu can be displayed at a given time, and the viewer is less likely to get caught in layer upon layer of menus.

Furthermore the interface is designed to be expandable, so that as more services become available and more programming is offered, they can be easily added to the interface. In a further aspect, the interface can be provided in a unique, real-world representative mode. Through customization of various media objects, service providers can add or change the interface based on the provider's particular applications or needs.

A unique aspect of the interface is the provision of a "smart" media "valet". Through the use of intelligent filtering and weighting algorithms, the interface can be personalized for each viewer household. The valet can operate in a foreground or background mode, can gather information about the user for the benefit of the user and service providers, and increases the efficiency of the viewing experience for the viewer.

Yet another aspect of the interface is to provide interactive programming accessibility through the EPG. The EPG can be made to show the interactive services, such as home shopping and video on demand as regular channels in the television line-up, and thus a coherent paradigm is maintained for all services.

The various objects and advantages of the present invention will be apparent to those skilled in the art. Numerous modifications to the system, and variations to the means for distributing data over a communication medium, will be obvious to those of average skill in the art. For example, the information system is independent of the particular communications medium upon which it is used. Furthermore, the system is not limited to a single broadcast stream, but may include many different broadcast streams for transmitting data. Various methods of providing the media objects to the user, either entirely through the stream, or with a portion stored in the user's terminal, are contemplated. As an additional example, the system is not limited to the use of any particular end-user terminal, but may be utilized with any number of different end-user terminals. Such modifications are intended to be within the scope of the invention as disclosed in the instant written description, the figures, and the following claims.

What is claimed is:

1. An information delivery system for delivery of audio, video, and user data through a communication medium from a head end to a user end, the user end including a display device, the communication medium having a plurality of transmission channels, said channels carrying a variety of broadcast programming information on ones of said plurality of transmission channels, comprising:

a server node having means for broadcasting a data stream on a subset of said transmission channels, the data stream comprising a plurality of compressed data objects, each data object comprising at least one media object, each media object comprising a still image, a motion video image, an audio clip, or text in encoded form, the data objects further including broadcast programming content information and instruction code, directing the placement of the data and media objects on the display device to provide a broadcast programming information program guide, the data stream being substantially repeated at regular intervals in multiplexed fashion over the communication medium;

a client node coupled to the display device, the client node having means for receiving the data stream, for decompressing at least selected portions of the stream, and for producing a user-detectable output on the display device in response to the data stream.

2. The information delivery system of claim 1 wherein the system includes backchannel communication, and the client node communicates with the server node via the backchannel communication to process information requests from a viewer.

3. The information delivery system of claim 1 wherein the means for broadcasting includes means for broadcasting a plurality of data steams in a multiplexed fashion; and the means for receiving including means for producing a user-detectable output in a user-selectable subset of the plurality of data streams.

4. The information delivery system of claim 1 further including a user interface, a portion of the user interface being resident in the client node and a portion of the user interface being provided in at least one of the data objects.

5. The information delivery system as defined in claim 1 wherein the data stream is transmitted via the level two transport layer of the MPEG 2 transport standard.

6. The information delivery system as defined in claim 1 wherein a portion of the user interface is resident in the client note.

7. An information delivery system for use with a communication medium having a plurality of transmission channels, said channels carrying a variety of broadcast programming content on ones of said plurality of transmission channels from a head end to a user end, the user end including at least one display device, comprising:

a server node having means for broadcasting a plurality of data streams on a subset of said transmission channels in multiplexed fashion over the communication medium, each data stream being comprised of a plurality of compressed data and media objects in encoded form, each media object comprising a still image, a motion video image, an audio clip, or text in encoded form, the data objects including broadcast programming content information and instruction code directing the placement of the media objects on the display device to generate a user interface, including said content information, at least a majority of data stream being repeated at regular intervals, the data stream being formatted so that each object has a maximum latency;

at least one distribution node; and a plurality of client nodes coupled to the transmission channels at the user end each having means for receiving the data streams, for decompressing the streams, and for producing a user-detectable output in response to each data stream in a user-selectable subset of the plurality of data streams on at least one display device, and means for maintaining said user interface for said maximum latency.

8. The information delivery system of claim 7 wherein the data stream further includes boot instructions to the client node.

9. The information delivery system of claim 7 wherein said user interface comprises a program guide containing information on programming and services available on the information delivery system.

10. The information delivery system of claim 9 wherein the broadcast programming content information is updated prior to broadcast in the data stream.

11. The information delivery system as defined in claim 7 further including back communication between the user interface and the server node.

12. The information delivery system is defined in claim 7 wherein a portion of the user interface is resident in each said client node.

13. An information distribution system coupled to a transmission medium having a plurality of transmission channels, the transmission system carrying broadcast programming from a variety of broadcast sources to a user end, the user end including a display device, comprising:

a head end server broadcasting at least one compressed data stream on at least one of said transmission channels, the data stream including a plurality of media objects comprising a still image, a motion video image, an audio clip, text in encoded form or broadcast programming content information, and programming code directing the placement of the media object on the display device to generate a program guide, wherein the data stream is substantially repeated at regular intervals; and an end user terminal coupled to the head end server via said transmission medium and including means for receiving the data stream, means for displaying the objects on the display device, means for decompressing the data stream, and selectively interacting with the data stream to remove media objects and to display the media objects to the user display in response to user input.

14. The information delivery system of claim 13 wherein the data stream is broadcast via the level 2 transport layer of the MPEG-2 transport standard.

15. The information delivery system of claim 13 wherein the head end broadcasts a plurality of data streams, each data stream including a plurality of media objects and comprising a digital time multiplexed signal.

16. The information distribution system of claim 13 wherein the distribution system further includes:

at least one repeater node coupled between the head end and the end user terminal;

a client interface unit including means for decoding the data stream, and for producing a user detectible output in response to a user request to output a specific media object by decoding a subset of each of the data streams.

17. An information delivery system coupled to a transmission medium having a plurality of transmission channels, the transmission system carrying broadcast programming content from at least a broadcast television interface and at least one information service provider to a user end, the user end including a display device, including:

a head end broadcasting a data stream of compressed media objects comprising a still image, a motion video image, an audio clip, or text in encoded form, and programming code directing the placement of the media object on the display device, [in encoded form,] on at least one of said transmission channels, the head end including an encoding means for encoding information in the media objects into an encoded form;

wherein the data stream further includes a programming guide built from said media objects and containing programming information of content of the broadcast programming or the information service provider; and the user terminal is coupled to the head-end and receiving the media objects, the user terminal having an output and including decompression means and decoding means for decoding information in the media objects; and a user interface, at least partially stored in the user-terminal, the user interface including means for selecting a user-defined subset of media objects for provision to the output of the user terminal.

18. An information navigation system for an information delivery system, the information delivery system including a head end and a user end coupled by a transmission medium having a plurality of channels, the head end including a source of audio/visual programming transmitted on a first subset of said plurality of channels, comprising:

an electronic program guide, the electronic program guide comprising a content listing of the audio/visual programming available on the information delivery system;

a user interface, at least partially provided in the user end; and a service navigator, the user interface interacting with the service navigator and the electronic program guide, wherein the electronic program guide and user interface are transmitted to the user end in a data stream on a second subset of said plurality of channels, the data stream being comprised of a substantially repeating compressed stream of data objects including said content listing, motion video, audio, text and programming code directing the assembly of the user interface, and is responsive to user input.

19. An information delivery system for use with a communications network including a plurality of channels which provide broadcast program information, comprising:

a server providing a data stream comprising a plurality of compressed data objects, each data object comprising at least a plurality of media objects, each media object comprising a still image, a motion video image, an audio clip, or text in compressed form, and including at least one data object comprising programming content information, the data stream being repeated at regular intervals in multiplexed fashion over the communications network;

a user terminal and display device, coupled to the server via the communications network;

a programming guide containing information on services available on the information delivery system, the programming guide being built from said data objects provided in the data stream;

a user interface, at least a portion of which is provided in and built by the user terminal from the data objects in the data stream;

a service navigation system, interacting with the user interface and the programming guide, to record user preferences; and an interactive mechanism coupled to the user terminal for accessing, the programming guide, and user interface.

20. The user interface of claim 19 further including a broadcast television interface.

21. The user interface of claim 19 wherein the service navigation system further includes a user customizable selection guide which records user selections over a period of time and displays the selections when prompted by the user.

22. The user interface of claim 19 wherein the media objects are provided to the interface to change interactive components on the interface.

* * * * *